Figure 1:
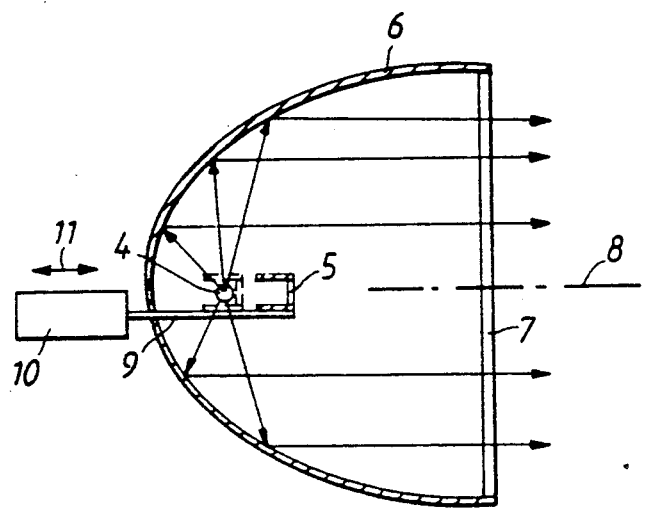

United States Patent
Fast et al.

Patent Number: 5,130,903
Date of Patent: Jul. 14, 1992

[54] ARRANGEMENT IN VEHICLE HEADLAMPS

[75] Inventors: Peder Fast, Kullavik; Lars-Göran Rosengren, Frölunda, both of Sweden

[73] Assignee: Ultralux AB, Gothenburg, Sweden

[21] Appl. No.: 690,763

[22] Filed: Apr. 24, 1991

[30] Foreign Application Priority Data

Apr. 27, 1990 [SE] Sweden ................. 9001537

[51] Int. Cl.$^5$ .............................. B60Q 1/00
[52] U.S. Cl. ..................... 362/61; 362/284; 362/802
[58] Field of Search ............. 362/61, 293, 284, 802

[56] References Cited

U.S. PATENT DOCUMENTS

| | | | |
|---|---|---|---|
| 4,970,628 | 11/1990 | Bergkvist | 362/61 |
| 4,987,521 | 1/1991 | Fratty et al. | 362/284 |
| 5,029,050 | 7/1991 | Bergkvist | 362/61 |

FOREIGN PATENT DOCUMENTS 2502558  10/1982  France ................. 362/61

Primary Examiner—Carroll B. Dority
Attorney, Agent, or Firm—Nies, Kurz, Bergert & Tamburro

[57] ABSTRACT

An arrangement in vehicle headlamps which are intended to emit a significant proportion of ultraviolet light. The invention is characterized by a control circuit (1) for adjusting, via means (3; 5, 9, 10), the intensity of the ulraviolet light emitted by the headlamp (6); vehicle speed sensing means (2) intended to deliver to the control circuit (1) an electric signal corresponding to prevailing vehicle speed; and further characterized in that the control circuit (1) is constructed to decrease said intensity to a predetermined, lower level when the speed lies beneath a predetermined value, and to increase the intensity to a predetermined, higher level when the speed lies above a predetermined value.

10 Claims, 1 Drawing Sheet

ARRANGEMENT IN VEHICLE HEADLAMPS

The present invention relates to an arrangement in vehicle headlamps, primarily car headlamps. More specifically, although not exclusively, the invention relates to headlamps of the kind which emit light that includes a large proportion of ultraviolet light, or alternatively which emits solely ultraviolet light.

It is a generally recognized problem that while the full headlight of a car will illuminate adequately the surroundings in front of the car it will also, at the same time, dazzle the drivers and passengers of oncoming vehicles. Dipped headlights, while not dazzling the driver or passengers of oncoming vehicles, do not illuminate satisfactorily the surroundings in front of the vehicle. Normally, however, the extent to which the road and surroundings are illuminated by dipped headlights is sufficient to enable the driver to drive the car on the road.

However, the ability of the driver to observe objects, such as road signs and other fixed markings, and also pedestrians, is greatly impaired when travelling on dipped headlights as opposed to full beam or full headlights.

Since a normal so-called dipped-headlight image of car headlamps does not illuminate an area above the road surface greater than about 0.5 to 1 meter with any appreciable intensity, the light reflected from road signs and the like is often too weak to be detected by the driver. Reflectors carried by pedestrians are observed at much shorter distances when driving on dipped headlamps than when driving on full beam.

It has become progressively more desirable to equip vehicles with lamps which emit ultraviolet light. Such light influences a number of mutually different paints, dyes or colours that fluoresce to a greater or lesser extent. In recent time it has become progressively more usual to use so-called day-glow inks or paints, i.e. inks or paints which when irradiated by ultraviolet light (UV) emits light of visible wavelength. Certain objects are painted with day-glow paints along roads, even at present. Furthermore, certain emergency service vehicles are painted with broad stripes in day-glow paints. Light-coloured clothing will also fluoresce relatively well when irradiated with ultraviolet light.

If vehicles were able to emit ultraviolet light, it would be possible, from a traffic safety aspect, to paint verge posts along the roads, road signs, etc., either completely or partially in day-glow paints to a greater extent than what is now the case.

Swedish Patent No. (Patent application No. 8704118-2) corresponding to U.S. Pat. No. 4,970,628, dated Nov. 13, 1990, describes and illustrates a headlamp for emitting both ultraviolet light and visible light. According to this patent, the light source is intended to emit both a large proportion of visible light and a large proportion of ultraviolet light. A filter is located in the beam path of the lamp, so as to filter-out that part of the visible light emitted by the light source in a lobe corresponding to the difference between a so-called full-beam lobe and a so-called dipped-beam lobe. When using a headlamp of this kind, it is conceivable for the vehicle to be equipped with an additional headlamp which will solely emit visible light in a dipped-beam lobe and/or in a full-beam lobe.

It is also conceivable to equip a vehicle with headlamps which solely emit ultraviolet light and to place these headlamps on one side of conventional headlamps designed to emit visible light.

One problem with the use of headlamps which emit ultraviolet light is that there is a danger, although a small danger, that a person can be exposed to the ultraviolet light over long periods of time and in close proximities. An example of this is found in children who stand close to the vehicle and look directly into the headlamp. Another example is found in a person carried by a vehicle in a stationary queue of cars, who looks directly into the head beam of an oncoming, but stationary vehicle. Irrespective of how the person is exposed to such ultraviolet light, there is a risk, although a small risk, of injury to the eyes. This problem is solved by the present invention.

The present invention thus relates to an arrangement in vehicle headlamps which are constructed to emit a significant proportion of ultraviolet light, and is characterized by a control circuit which is intended to control the intensity of the ultraviolet light emitted by the headlamp, via means herefore; by a speed sensing means which is intended to deliver to the control circuit an electric signal which corresponds to the speed in question; and is further characterized in that the control circuit is intended to lower said intensity to a predetermined lower level when the speed is beneath a predetermined value, and to increase said intensity to a predetermined higher level when said speed is above a predetermined value.

Figure 2:
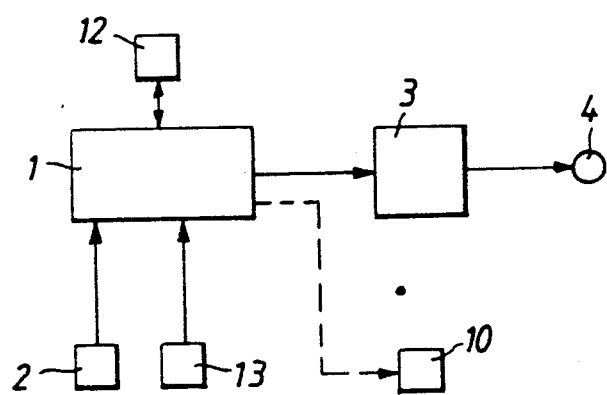

The invention will now be described in more detail, partly with reference to exemplifying embodiments thereof illustrated in the accompanying drawing, in which FIG. 1 illustrates schematically a vehicle headlamp in which one embodiment of the invention is applied, and FIG. 2 is a block schematic.

The light sources referred to here are so-called discharge lamps which emit a relatively high proportion of light within the ultraviolet wavelength range.

According to the invention, there is provided a control circuit 1 (see FIG. 2) which is intended to control the intensity of the ultraviolet light emitted by the headlamp, via means herefor. The control circuit may be a separate microprocessor. Alternatively, a data processor, a so-called onboard processor already installed in the vehicle may be used. Connected to the data processor is a speed sensing means 2 which is intended to deliver to the control circuit 1 an electrical signal corresponding to the speed sensed. In modern cars fitted with electronic speedometers, the means which functions to deliver an electric signal to the speedometer forms the aforesaid speed sensing means. The last mentioned signal is delivered to the control circuit 1.

The control circuit 1 is constructed to lower the intensity of the emitted ultraviolet light to a predetermined lower level when the vehicle speed lies beneath a predetermined value, and conversely to increase the intensity of the light to a predetermined higher level when the vehicle speed lies above a predetermined value.

According to one preferred embodiment of the invention, the means for controlling the intensity of the ultraviolet light emitted by the vehicle headlamp may comprise a drive means 3 of a suitable known kind intended to supply the light source 4 with an operating electric alternating voltage. In this regard, the control circuit is intended to influence the drive means 3 in a manner such as to change the intensity of the light source 4. The control circuit, herewith, causes the drive means to change the voltage and/or the frequency of the output signal of the drive means delivered to the light source 4. The person skilled in this art will be quite capable of providing for suitable changes in the voltage and/or frequency for a given light source and a given drive means in order to achieve desired changes in the intensity of the light source and therewith in the intensity of the light emitted by said light source.

According to another, alternative embodiment, the control circuit is intended to influence a filter 5 located in the beam path extending from the light source to the glass 7 of the headlamp 6. The filter 5 is intended to filter-out ultraviolet light. This will result in variation of the intensity of the ultraviolet light emitted from the vehicle headlamp. In the case of the embodiment illustrated in FIG. 1, the filter 5 has a cylindrical configuration and is placed along the optical axis 8 of the headlamp. The filter 5 can be displaced between a first end position, shown in full lines in FIG. 1, in which the filter is located in front of the light source, to a second end position, shown in broken lines in FIG. 1, in which the filter is displaced so as to surround the light source. Any appropriate means can be used for displacing the filter. In the case of the FIG. 1 embodiment, the filter 5 is attached to a pull rod 9 which is manouvered between said end positions by means of a double-acting draw magnet 10. The draw magnet is thus arranged to move the pull rod 9, and therewith the filter, in the directions of the arrow 11. The filter can, of course, be configured in some other way, for instance as a flat or dished disc or the like mounted in the beam path, said disc being arranged for movement between two rotational positions, in which in one position the disc is so positioned in the beam path as to filter-out ultraviolet light, and in the other position permits the beam rays to pass from the light source out of the headlamp.

FIG. 2 is a block schematic which illustrates the connection of said draw magnet 10 in broken lines. When a filter 5 is used in the beam path, the possibility of controlling the drive means 3 in the aforesaid manner is not used primarily. However, the two solutions described above can be applied simultaneously.

It has been mentioned above that the control circuit 1 is intended to lower the intensity of the ultraviolet light emitted by the headlamp to a predetermined lower level when the vehicle speed lies beneath a predetermined value, and to increase the light intensity to a predetermined higher level when the vehicle speed lies above a predetermined value.

This is done because the risk of a person peering into a vehicle headlamp which emits ultraviolet light over a long period of time is only present when the vehicle is stationary.

Consequently, according to a first embodiment, the control circuit is intended to extinguish the light source when the vehicle speed lies beneath a given predetermined value and to ignite the light source when the vehicle speed lies above a given predetermined value.

According to one embodiment of the invention, this predetermined vehicle speed is zero. Thus, the vehicle headlamp is extinguished immediately when the vehicle stops and is ignited when the vehicle starts to move. Such light sources, however, have a given starting-up time before they produce full light. This embodiment is conceivable, but is encumbered with the further drawback that the useful life of a discharge lamp is shortened when it is extinguished and ignited often.

For this reason, in accordance with one preferred embodiment of the invention, the aforesaid control circuit includes a time delay circuit 12 or the like which is so designed that the control circuit 1 will respectively increase and decrease the intensity of the emitted ultraviolet light only when the vehicle speed has remained respectively beneath or above said predetermined vehicle speed over a given predetermined length of time.

When this predetermined speed is zero, the time delay may, for instance, be from 30 seconds to one minute, which means that the vehicle headlamps will not be extinguished when the vehicle concerned stops at traffic lights.

Naturally, other time values can be chosen, depending on traffic situations, so that the vehicle headlamps will not be extinguished and ignited unnecessarily. This time period, however, should not exceed the longest time period that a person can peer or look into the headlamps without risk of eye injury.

When the predetermined vehicle speed is set to a value greater than zero, it may be for the following reason. The ultraviolet light is most needed when the vehicle is driven on country roads, and then particularly when the vehicle is driven at speeds above, for instance, 50 km/h. When the predetermined vehicle speed is set to 50 km/h and the time delay is set to one minute, the vehicle headlamps will normally be ignited constantly when the vehicle concerned is driven on country roads. However, when the vehicle is driven into a built-up area, for instance, or is waiting in queues on minor roads or slip roads for access to major roads, the vehicle speed will rapidly fall to beneath 50 km/h over a period of one minute, thereby causing the headlamps to be extinguished. When the vehicle is again driven on country roads, the vehicle speed will rapidly increase to above 50 km/h over a longer period than one minute. In this way, there is less risk of a person peering into the headlamps of the vehicle over a longer period than the predetermined time period, i.e. in this example one minute, when the vehicle is located in a queue of vehicles, or in some like circumstance. It is again mentioned that different times and different speeds can be chosen for different purposes and different traffic situations.

The aforegoing has dealt solely with a totally extinguished or a fully ignited light source.

In accordance with one preferred embodiment of the invention, however, the control circuit may be designed to lower the intensity of the light source gradually, i.e. without extinguishing the light source with respect to speed, when the speed lies beneath a given predetermined value.

Correspondingly, the control circuit may be designed to increase the intensity of the light source gradually when the vehicle speed lies above a given predetermined value.

This decrease and increase in light intensity may take place continuously, or alternatively in one or more stages. When a filter 5 is used, the filter may be configured with mutually different filtering properties along it length, for instance so that close to its left-hand opening as seen in FIG. 2 it will filter-off a smaller part of the ultraviolet light than closer to its right-hand part. This enables a larger or smaller proportion of the ultraviolet light to be filtered-out, according to the position of the filter in relation to the light source.

In these cases, the light source may be switched to a stand-by position, where light intensity is at its lowest.

This prevents the light source from becoming worn as quickly as when the light source is continuously switched on and off.

According to one preferred embodiment of the invention, the predetermined vehicle speeds at which said intensities are changed are the same irrespective of whether the speed is increased or decreased, i.e. there is found one single predetermined speed beneath which and above which the intensity is changed. It is conceivable, however, that the predetermined vehicle speeds will be different, depending on whether the speed is decreased or increased.

According to one preferred embodiment there is provided a light-responsive device 13 which is intended to detect the intensity of the surrounding light and which is intended to deliver an electric signal to the control circuit in correspondence with the intensity of the surrounding or ambient light. The light-responsive device 13 is suitably a phototransistor. The surrounding light, i.e. sunlight or light generated by artificial lighting, can be measured with said device positioned either inwardly of the vehicle windscreen or in some other position within the vehicle interior. The control circuit 1 is, in this case, intended to hold the light source 4 extinguished when the surrounding light has an intensity above a predetermined level, irrespective of vehicle speed. The level chosen will be so high as to render it unnecessary to use the vehicle headlamps. This avoids the case of a person peering into the headlamp without noticing that it is switched-on, because of excessively bright ambient light.

In the aforegoing a number of embodiments have been described with reference to times and vehicle speeds. Two exemplifying embodiments of the intensity varying device have also been described. It will be obvious to the person skilled in this art, however, that both times and vehicle speeds, and similarly the technical constructions of said device, can be modified without departing from the concept of the present invention.

Consequently, the present invention shall not be considered to be limited to the aforedescribed exemplifying embodiments thereof, since modifications and changes can be made within the scope of the following claims.

We claim:

1. An arrangement in the headlamps of automotive vehicles intended to emit a significant proportion of ultraviolet light, characterized by a control circuit (1) for adjusting, via means (3; 5, 9, 10), the intensity of the ultraviolet light emitted by the headlamp (6); vehicle speed sensing means (2) intended to deliver to the control circuit (1) an electric signal corresponding to prevailing vehicle speed; and further characterized in that the control circuit (1) is constructed to decrease said intensity to a predetermined, lower level when the speed lies beneath a predetermined value, and to increase the intensity to a predetermined, higher level when the speed lies above a predetermined value.

2. An arrangement according to claim 1, characterized in that the control circuit (1) includes a time delay circuit (12) or corresponding means, so constructed that the control circuit (1) will respectively increase and decrease said intensity when the vehicle speed has remained beneath and above said predetermined speeds respectively for a given predetermined length of time.

3. An arrangement according to claim 1, characterized in that the control circuit (1) is intended to decrease the intensity of the light source (4) gradually with respect to vehicle speed, when said speed lies beneath a given predetermined value.

4. An arrangement according to claim 1, characterized in that the control circuit (1) is intended to increase the intensity of the light source (4) gradually when the vehicle speed lies above a given predetermined value.

5. An arrangement according to claim 1, characterized in that the control circuit (1) is intended to extinguish the light source (4) when the vehicle speed lies beneath a given predetermined value and to ignite the light source (4) when the vehicle speed lies above a given predetermined value.

6. An arrangement according to claim 1, characterized in that the predetermined speeds at which said intensities are changed are the same, irrespective of whether the vehicle speed has been increased or decreased.

7. An arrangement according to claim 1, characterized in that said predetermined speeds are zero.

8. An arrangement according to claim 1, characterized in that the control circuit (1) is intended to influence a drive means (3) such as to provide the light source (4) with the electrical alternating voltage so as to change the intensity of the light source.

9. An arrangement according to claim 1, characterized in that the control circuit (1) is intended to influence a filter (5) located in the beam path from the light source (4) to the headlamp glass (7), said filter being intended to filter-out ultraviolet light such as to vary the intensity of the ultraviolet light emitted form the headlamp.

10. An arrangement according to claim 1, characterized by a light-responsive device (13) which is intended to detect the intensity of the surrounding light and to deliver to the control circuit an electric signal which corresponds to the intensity of said surrounding light, and is further characterized in that the control circuit (1) is constructed to hold the light source (4) extinguished when the intensity of the surrounding light lies above a predetermined level, irrespective of the vehicle speed.

* * * * *

UNITED STATES PATENT AND TRADEMARK OFFICE
CERTIFICATE OF CORRECTION

PATENT NO. : 5,130,903
DATED : July 14, 1992
INVENTOR(S) : PEDER FAST and LARS-GORAN ROSENGREN It is certified that error appears in the above-identified patent and that said Letters Patent is hereby corrected as shown below:

ON THE Title Page :

Col. 1, item [73], please correct the spelling of the city of ASSIGNEE to read --GÖTEBORG--.

Signed and Sealed this

Seventeenth Day of August, 1993

Attest:

BRUCE LEHMAN

Attesting Officer

Commissioner of Patents and Trademarks